(12) United States Patent
Chen et al.

(10) Patent No.: US 11,410,482 B2
(45) Date of Patent: Aug. 9, 2022

(54) INFORMATION PROCESSING METHOD AND APPARATUS, ELECTRONIC DEVICE, AND STORAGE MEDIUM

(71) Applicant: NINEBOT (BEIJING) TECH. CO., LTD, Beijing (CN)

(72) Inventors: Zichong Chen, Beijing (CN); Chunyang Sun, Beijing (CN); Li Pu, Beijing (CN)

(73) Assignee: NINEBOT (BEIJING) TECH CO., LTD, Beijing (CN)

( * ) Notice: Subject to any disclaimer, the term of this patent is extended or adjusted under 35 U.S.C. 154(b) by 338 days.

(21) Appl. No.: 16/626,099

(22) PCT Filed: May 24, 2018

(86) PCT No.: PCT/CN2018/088225
§ 371 (c)(1),
(2) Date: Dec. 23, 2019

(87) PCT Pub. No.: WO2019/128066
PCT Pub. Date: Jul. 4, 2019

(65) Prior Publication Data
US 2020/0211313 A1 Jul. 2, 2020

(30) Foreign Application Priority Data
Dec. 28, 2017 (CN) .......................... 201711464065.1

(51) Int. Cl.
*G07F 11/42* (2006.01)
*G07F 9/02* (2006.01)
(Continued)

(52) U.S. Cl.
CPC ............. *G07F 11/42* (2013.01); *G06T 7/246* (2017.01); *G07F 9/026* (2013.01); *G07F 11/16* (2013.01)

(58) Field of Classification Search
CPC .......... G07F 11/42; G07F 9/026; G07F 11/16; G06T 7/246
See application file for complete search history.

(56) References Cited

U.S. PATENT DOCUMENTS 6,345,852 B1 * 2/2002 McCarthy ............. B60P 3/0257
296/22
7,894,939 B2 * 2/2011 Zini .................... G06K 19/0723
700/245
(Continued)

FOREIGN PATENT DOCUMENTS

CN 105159236 A 12/2015
CN 106054901 A 10/2016
(Continued)

OTHER PUBLICATIONS

International Search Report in the international application No. PCT/CN2018/088225, dated Sep. 30, 2018, 2 pgs.
(Continued)

*Primary Examiner* — Michael Collins
(74) *Attorney, Agent, or Firm* — Cooper Legal Group, LLC

(57) ABSTRACT

Disclosed are an information processing method and apparatus, an electronic device, and a storage medium. The information processing method is applied to a mobile device loaded with articles, and comprises: determining a motion parameter according to a motion mode and obstacle information; carrying out a motion according to the motion parameter; collecting pre-determined information during the motion; and if the pre-determined information indicates that a user needs to acquire an article, suspending the motion.

19 Claims, 4 Drawing Sheets

(51) Int. Cl.
     *G07F 11/16*      (2006.01)
     *G06T 7/246*      (2017.01)

(56) References Cited

U.S. PATENT DOCUMENTS

| | | | | |
|---|---|---|---|---|
| 8,204,624 | B2* | 6/2012 | Zini | G06Q 10/087 |
| | | | | 700/245 |
| 10,275,975 | B2* | 4/2019 | High | G07F 9/009 |
| 10,854,033 | B2* | 12/2020 | Jafa | G05D 1/0044 |
| 10,875,174 | B2* | 12/2020 | Skaaksrud | G05D 1/0276 |
| 2010/0100241 | A1* | 4/2010 | Jarisch | A47J 31/407 |
| | | | | 700/259 |
| 2010/0234990 | A1* | 9/2010 | Zini | G06K 7/0008 |
| | | | | 700/245 |
| 2012/0104785 | A1* | 5/2012 | Hixson | B60P 3/0257 |
| | | | | 296/24.36 |
| 2017/0011580 | A1* | 1/2017 | Huang | G07F 13/00 |
| 2018/0068514 | A1 | 3/2018 | Li et al. | |
| 2021/0162585 | A1* | 6/2021 | Yang | B25J 9/1617 |

FOREIGN PATENT DOCUMENTS

| | | |
|---|---|---|
| CN | 106355345 A | 1/2017 |
| JP | 2007152442 A | 6/2007 |

OTHER PUBLICATIONS

Supplementary European Search Report in the European application No. 18897608.8, dated Mar. 5, 2020, 6 pgs.

\* cited by examiner

INFORMATION PROCESSING METHOD AND APPARATUS, ELECTRONIC DEVICE, AND STORAGE MEDIUM

CROSS-REFERENCE TO RELATED APPLICATION

This application is based upon and claims priority to Chinese patent application No. 201711464065.1 filed on Dec. 28, 2017, the disclosure of which is hereby incorporated by reference in its entirety.

TECHNICAL FIELD

The disclosure relates, but is not limited, to the technical field of information, and in particular to an information processing method and apparatus, an electronic device and a storage medium.

BACKGROUND

An automatic vending machine is a machine for automatically selling a commodity. In a related art, an automatic vending device is fixedly disposed in a special place. If a position of the automatic vending device is inaccurate, the utilization rate of the automatic vending device is very low, and public space is occupied. When a user needs to purchase a commodity and it is inconvenient to order a take-out, the user must walk to the automatic vending machine to purchase the commodity. So to some extent the automatic vending machine serves as a shopping store without a shop assistant to sell a commodity, thereby meeting a selling requirement of/for some places where it is unsuitable for setting a physical store. Nonetheless, the solving degree is limited, purchasing requirements of the user are still not met well, and purchasing experience of the user is still very poor.

SUMMARY

In view of this, embodiments of the disclosure are intended to provide an information processing method and apparatus, an electronic device and a storage medium.

The technical solutions of the disclosure are implemented as follows.

According to a first aspect, an embodiment of the disclosure provides an information processing method, which is applied to a mobile device loaded with an article, and includes:

a motion parameter is determined according to a motion mode and obstacle information;

a motion is carried out according to the motion parameter;

pre-determined information is collected during the motion; and the motion is suspended when the pre-determined information indicates that a user needs to acquire the article.

According to a second aspect of embodiments, an embodiment of the disclosure provides an information processing apparatus, which is applied to a mobile device loaded with an article, and includes:

a determination unit, configured to determine a motion parameter according to a motion mode and obstacle information;

a motion unit, configured to carry out a motion according to the motion parameter; and a collection unit, configured to collect pre-determined information during the motion.

The motion unit is further configured to suspend the motion when the pre-determined information indicates that a user needs to acquire the article.

According to a third aspect, an embodiment of the disclosure provides an electronic device, which includes: a transceiver, a memory, a processor, and a computer program stored on the memory and executed by the processor.

The processor is connected to the transceiver and the memory respectively, and configured to perform, by executing the computer program, the above information processing method of one or more technical solutions as above.

According to a fourth aspect, an embodiment of the disclosure provides a computer storage medium; the computer storage medium stores a computer program; and the computer program is executed to perform the above information processing method of one or more of technical solutions as above.

According to the information processing method and apparatus, the electronic device and a storage medium in the embodiments of the disclosure, the mobile device is used to load an article required by a user. The mobile device automatically determines a motion parameter according to a motion mode and obstacle information, collects pre-determined information, and stops moving temporarily when the user has an article demand based on the pre-determined information. Therefore, the mobile device automatically sets the motion parameter, and moves to the user with the article demand, thus being convenient for the user to take the article. If the mobile device is an automatic vending machine, it is apparent that the automatic vending machine can move independently. Compared with the automatic vending machine fixedly disposed in a special area, the frequency that the user uses the automatic vending machine can be improved apparently, and the effective utilization rate of the automatic vending machine is improved. Moreover, the user can take the article without moving to a special position, so that the user operation is simplified apparently, and the user experience is improved.

DETAILED DESCRIPTION

The technical solutions of the disclosure are further elaborated below in detail in combination with the accompanying drawings and specific embodiments of the specification.

Figure 1:
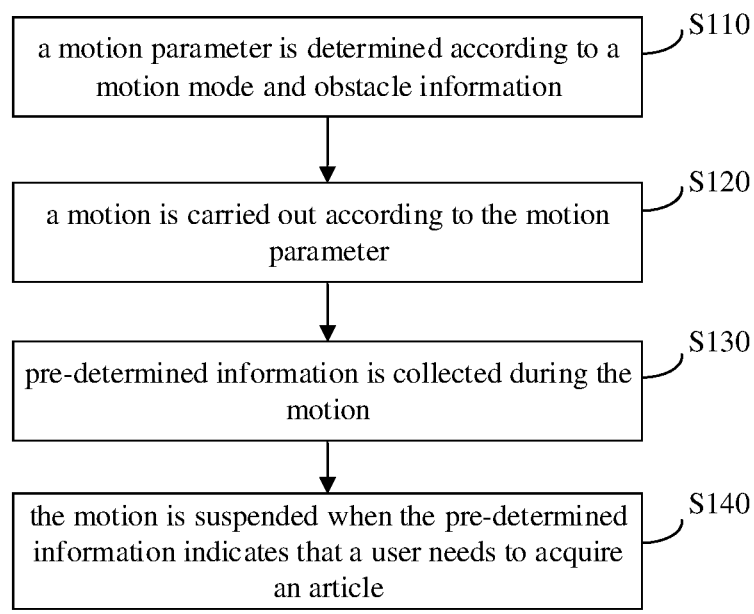
FIG. 1 is a flow chart of an information processing method according to an embodiment of the disclosure.

As illustrated in FIG. 1, in an embodiment, an information processing method is provided. The method is applied to a mobile device loaded with an article, and includes the following operations.

At S110: a motion parameter is determined according to a motion mode and obstacle information.

At S120: a motion is carried out according to the motion parameter.

At S130: pre-determined information is collected during the motion.

At S140: the motion is suspended when the pre-determined information indicates that a user needs to acquire the article.

The information processing method in this embodiment can be a method applied to various mobile devices. The mobile device is loaded with the article capable of meeting an article demand of the user, such as a commodity consumed by the user, a tool and/or a raw material required by the work of the user.

The mobile device can be a mobile device loaded with the article. For example, the mobile device can be a robot including a motion chassis, capable of moving on the ground and carrying/bringing an article. Also for example, the mobile device can be a flight robot including a flight apparatus, capable of flying and carrying an article meeting an article demand of the user, etc.

The mobile device includes a moving apparatus and a loading apparatus. The moving apparatus is configured to move the mobile device to implement the conversion of the mobile device in different spaces. The loading apparatus is configured to load an article, so that the mobile device carries the article for motion.

In this embodiment, the mobile device determines the motion parameter according to the motion mode and the obstacle information. In this embodiment, the motion parameter can include: a motion direction, a motion speed, motion acceleration, a target position of the motion and other information.

Once the motion parameter is determined, the motion is carried out according to the motion parameter.

The pre-determined information is collected in a movement process/during the motion. The pre-determined information can be any information for indicating that the user intends to take the article from the mobile device.

If it is detected that the user needs to take the article from the mobile device, the motion is suspended to provide convenience for the user to take the article.

If the mobile device is a mobile automatic vending machine, the motion of the automatic vending machine is suspended, so that the user is convenient to purchase the article via a manner of inserting a coin or scanning a code with a mobile phone, and purchases the commodity from the mobile automatic vending machine.

Therefore, if the mobile device in this embodiment is the automatic vending machine, the automatic vending machine is no longer disposed at a special position statically but can move freely. Compared with the automatic vending machine statically disposed at the special position, the use frequency of the automatic vending machine can be improved. The user can purchase the article without moving to a special area, and the user experience is improved.

Certainly, in this embodiment, the mobile device is not limited to the automatic vending machine, and can further be a mobile device which helps the user to deliver other articles. For example, the mobile device is a device for delivering a file to a staff member in an office area.

In some embodiments, the method further includes the following operation.

If an article distributing operation is completed, the mobile device restores the motion according to the motion parameter.

For example, if the mobile device is the automatic vending machine and the selling is completed, the mobile device continues to move, and the motion parameter for continuing to move is also determined according to the motion mode and the obstacle information.

In some embodiments, the step S130 can include at least one of the followings.

Operation information acted on a man-machine interaction module is collected during the motion.

First image information is collected during the motion.

Voice information is collected during the motion.

For example, the man-machine interaction module capable of being operated by the user, such as a physical button operated by the user and a virtual button displayed via a keyboard, is provided/set on the mobile device. The user can operate the man-machine interaction module to input an instruction to the mobile device, so that the mobile device collects the operation information. If one user operates the mobile device, it is indicated that the user has a demand for taking the article from the mobile device. Thus, when the mobile device collects the operation information, the motion is suspended. In this embodiment, if an operation indicated by the operation information is a pre-determined operation for taking the article, the mobile device suspends the motion.

In some embodiments, the mobile device collects the first image information by using/by means of a camera during the motion, for example, one user waves a hand to the mobile device. It is indicated that the user has a demand for taking the article from the mobile device. Also for example, if one user peers at the mobile device for a long time, it is also indicted that the user has the demand for taking the article from the mobile device.

In this embodiment, the image information is analyzed to determine whether the user executes the pre-determined operation corresponding to an article taking demand. If the user executes the pre-determined operation corresponding to the article taking demand, the mobile device suspends the motion.

In some other embodiments, the mobile device is provided with a voice interaction module, which can collect a voice of the user. With semantic analysis on the voice of the user, it can be determined whether the user has a demand for acquiring the article; and if yes, the mobile device suspends the motion, so that the user takes the article from the mobile device conveniently.

Figure 2:
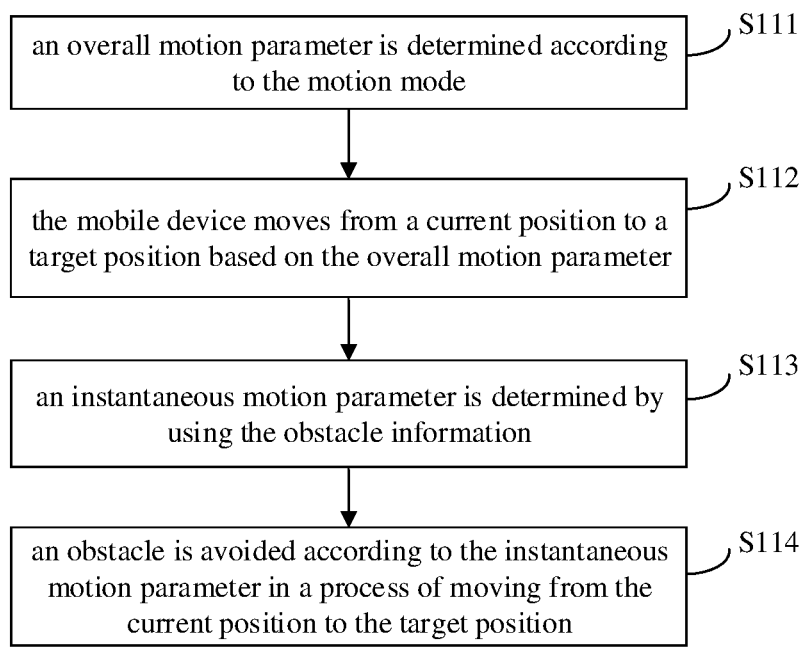
FIG. 2 is a flow chart for determining a movement parameter according to an embodiment of the disclosure.

In some embodiments, as illustrated in FIG. 2, the step S110 and the step S120 can include the following operations.

At S111: an overall motion parameter is determined according to the motion mode.

At S112: the mobile device moves from a current position to a target position based on the overall motion parameter.

At S113: an instantaneous motion parameter is determined by using the obstacle information.

At S114: an obstacle is avoided according to the instantaneous motion parameter in a process of moving from the current position to the target position.

In this embodiment, the overall motion parameter is determined first according to the motion mode. Herein, the overall motion parameter is a motion parameter on which the mobile device acts within a period of time, for example, an overall motion direction of the motion from the current position to the target position, and also for example, an average motion rate of the motion from the current position to the target position and the like.

Meanwhile, during the motion, the mobile device determines obstacle information of a passed position in real-time, for example, the mobile device acquires an obstacle map of the position where the mobile device is located in real time, and determines the obstacle according to the obstacle map. The mobile device needs to bypass/avoid these obstacles. Otherwise, the mobile device will be collided with a building or a pedestrian. Thus, in this embodiment, the mobile device further needs to acquire the obstacle information, and determines the instantaneous motion parameter according to the obstacle information. The action time of the instantaneous motion parameter is relative to/with respect to the action time of the overall motion parameter. For example, the mobile device can encounter the obstacle in the process of moving from the current position to the target position, and can need to steer and turn around. At this time, the motion direction and the overall motion direction can be inconsistent or even reverse. In brief, the step S114 can include: an instantaneous motion state of the mobile device is adjusted according to the instantaneous motion parameter during the motion of the mobile device. The instantaneous motion state can include: one or more of instantaneous motion parameters such as an instantaneous motion direction, an instantaneous motion rate and instantaneous acceleration.

In this embodiment, the instantaneous motion parameter is determined according to the obstacle information, and a current speed of the mobile device is adjusted in real time according to the instantaneous motion parameter. However, in the process of moving from the current position to the target position, the combined effect of all instantaneous motion parameters is consistent with that of the overall motion parameter.

In some embodiments, the step S111 can include the following operations.

If the motion mode is a first motion mode, a motion path and an overall motion direction corresponding to the first motion mode are determined; herein the motion path is a circular path including multiple sites/stations.

One site is selected from the circular path to serve as the target position; herein the selected site is a site nearest to the mobile device in the overall motion direction.

In this embodiment, the motion mode includes multiple types of modes, for example, the motion mode is the first motion mode. The motion path corresponding to the first motion mode is pre-stored in the mobile device or can be received from a server on a network side. The motion path can be formulated in advance. The motion path is a circular path passing through multiple sites optionally. In this way, the mobile device can move along the circular path repeatedly.

In this embodiment, the overall motion direction includes: a first direction for moving clockwise along the circular path, and a second direction for moving counterclockwise along the circular path.

In this embodiment, the motion device moves from the current position to a next site. The next site is a site nearest to the mobile device in the overall motion direction of the circular path. For example, the circular path includes a site A and a site B. If the mobile device is located between the site A and the site B at present and the overall motion direction of the mobile device points to the site A, the site A is the target position of the mobile device. Since the overall motion direction of the mobile device points to the site A, even though the site B is nearer to the position of the mobile device, the target position is also the site A rather than the site B.

In some embodiments, the step S111 can include the following operations.

If the motion mode is a second motion mode, second image information is collected.

The second image information is analyzed to determine a potential user, and position information of the potential user is acquired.

The target position to which the mobile device moves is determined according to the position information.

In this embodiment, if the motion mode is the second motion mode, the second image information is collected. The mobile device further analyzes the second image information, for example, the mobile device analyzes a collected image by using a learning model to determine a potential user. The potential user can be a user having/with a relatively high probability of taking the article from the mobile device. Position information of the potential user is further acquired, and a target position of the mobile device is determined according to the position information. The target position can be a position having a pre-determined distance with the potential user.

For example, the position information of the mobile device is determined by means of analyzing a size of the user in the image collected by the mobile device, and in combination with a collection parameter of a camera. The mobile device takes a position having 1 m with the potential user and facing to a face of the user as the target position.

For example, if one user peers at the mobile device for a long time or waves a hand to the camera of the mobile device, it can be indicated that the user is a target user or potential user. Also for example, if the mobile device is loaded with a snack, it can be defined that a child is the potential user, and a user having a short and small physique can be selected as the potential user by means of image collection and image analysis.

In brief, in this embodiment, the potential user can be selected according to a pre-determined strategy, and can be specifically as follows.

A user with an included angle between a located direction and the overall motion direction of the mobile device within a preset range is taken as the potential user. The preset range can be a preset included angle, and the selected potential user is basically consistent with the motion direction of the mobile device.

The collected image is analyzed, and a user with a movement direction along the overall motion direction is selected from the image as the potential user.

A user attribute such as an age, a gender and a stature is acquired according to an analytical result of the image, and an alternative user matched with the article loaded on the mobile device is selected as the potential user according to the user attribute.

An alternative user with the located direction consistent with an instantaneous motion direction of the mobile device is selected from the image as the potential user.

In some embodiments, the step S111 can include the following operations.

If the motion mode is a third motion mode, area information of/about a first type of area and a second type of area is determined; herein demand frequency of the article in the first type of area is higher than that in the second type of area.

It is determined that the first type of area is selected at a first priority as an area where the target position is located, and the second type of area is selected at a second priority as the area where the target position is located. The first priority is higher than the second priority.

In this embodiment, if the motion model is a third motion model, the area information of the area is acquired. The area information can be boundary information of different areas. According to the boundary information, the mobile device can know where it is located, or determine a type of an area near to a periphery of the mobile device.

In this embodiment, the first type of area is an area with higher demand frequency of the article. Hence, in this embodiment, it is determined that the first type of area is selected at the first priority as the area where the target position is located. If the mobile device plans a path at this time, a path entering to or passing through the first type of area is selected preferably.

Therefore, the mobile device has a larger probability to pass through the first type of area and to retain in the first type of area for longer time, so that the article demand of the user is better met, and the operation efficiency of the mobile device is improved.

In some embodiments, the step S111 further includes the following operation.

A first average motion rate for the first type of area and a second average motion rate for the second type of area are determined; herein the first average motion rate is lower than the second average motion rate.

In this embodiment, both the first average motion rate and the second average motion rate pertain/belong to one of the overall motion parameter. In order to better meet the demand of the user in the area with the high demand frequency of the article, the mobile device moves in the first type of area at a slower average speed and moves in the second type of area at a higher average motion speed, thus further improving the effective utilization rate of the mobile device and the satisfaction degree of the user in use.

In some embodiments, the method further includes the following operation.

Energy supplementation is carried out in an energy supplementation area in a first time interval.

The step S120 can include the following operation.

The motion is carried out in an area out of the energy supplementation area in a second time interval according to the motion parameter.

The demand frequency of the article in the first time interval is lower than that in the second time interval.

In this embodiment, the energy supplementation area can be a charging area of an electric driving device, and can also be a fuel supplementation area of a fuel driving device.

The first time interval is a time interval with lower demand frequency of the article, and the second time interval is a time interval with higher demand frequency of the article. In this embodiment, in order to prevent that the mobile device cannot move or cannot provide the article for the user in a time interval with higher demand frequency of the article due to energy shortage, the mobile device preferably enters the energy supplementation area in the first time interval for energy supplementation to guarantee that the mobile device has sufficient energy to move in the area out of the energy supplementation area in the second time interval.

In some embodiments, the method further includes the following operation.

If energy of the mobile device reaches a preset upper limit in the first time interval, the mobile device can move in the area out of the energy supplementation area based on the determined motion parameter, thus providing convenience for the user to acquire the article.

Figure 3:
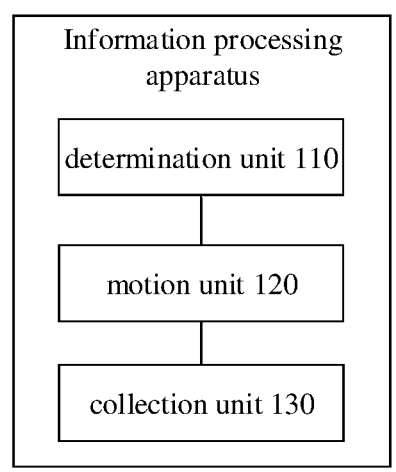
FIG. 3 is a structural schematic diagram of an information processing apparatus according to an embodiment of the disclosure.

As illustrated in FIG. 3, in an embodiment, an information processing apparatus is provided. The apparatus is applied to a mobile device loaded with an article, and includes: a determination unit 110, a motion unit 120 and a collection unit 130.

The determination unit 110 is configured to determine a motion parameter according to a motion mode and obstacle information.

The motion unit 120 is configured to carry out a motion according to the motion parameter.

The collection unit 130 is configured to collect pre-determined information during the motion.

The motion unit 120 is further configured to suspend the motion when the pre-determined information indicates that a user needs to acquire the article.

The information processing apparatus can be an information processing apparatus applied to the mobile device. The determination unit 110, the motion unit 120 and the collection unit 130 are all corresponding to a program unit, and a function of each unit can be implemented via execution of a processor.

In some embodiments, the collection unit 130 can be specifically configured to execute at least one of the followings.

Operation information acted on a man-machine interaction module is collected during the motion.

First image information is collected during the motion.

Voice information is collected during the motion.

In some embodiments, the determination unit 110 includes: a first determination module.

The first determination module is configured to determine an overall motion parameter according to the motion mode.

The motion unit 120 is configured to move from a current position of the mobile device to a target position based on the overall motion parameter.

The determination unit 110 further includes: a second determination module.

The second determination module is configured to determine an instantaneous motion parameter by using the obstacle information.

The motion unit 120 is further configured to avoid an obstacle according to the instantaneous motion parameter in a process of moving from the current position to the target position.

In some embodiments, the first determination module is configured to determine, if the motion mode is a first motion mode, a motion path and an overall motion direction corresponding to the first motion mode; herein the motion path is a circular path including multiple sites; and to select one site from the circular path to serve as the target position; herein the selected site is a site nearest to the mobile device in the overall motion direction.

In some embodiments, the first determination module can be configured to collect, if the motion mode is a second motion mode, second image information; to analyze the second image information to determine a potential user; to acquire position information of the potential user; and to determine a target position to which the mobile device moves according to the position information.

In some embodiments, the first determination module is configured to determine, if the motion mode is a third motion mode, area information of/about a first type of area and a second type of area; herein demand frequency of the article in the first type of area is higher than that in the second type of area; and to determine that the first type of area is selected at a first priority as an area where the target position is located, and the second type of area is selected at a second priority as an area where the target position is located; herein the first priority is higher than the second priority.

In some embodiments, the first determination module can be configured to determine a first average motion rate for the first type of area and a second average motion rate for the second type of area; herein the first average motion rate is lower than the second average motion rate.

In some embodiments, the apparatus further includes: a supplementation unit, configured to carry out energy supplementation in an energy supplementation area in a first time interval.

The motion unit 120 is specifically configured to carry out the motion in an area out of the energy supplementation area in a second time interval according to the motion parameter; herein the demand frequency of the article in the first time interval is lower than that in the second time interval.

Figure 4:
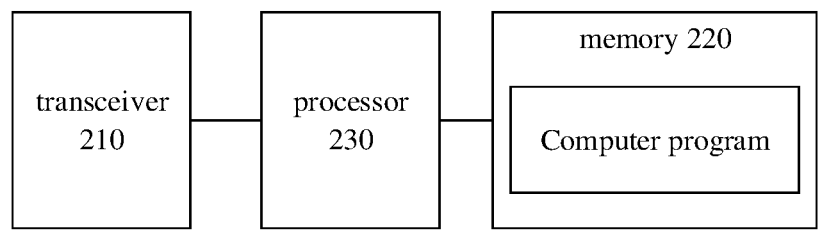
FIG. 4 is a structural schematic diagram of an electronic device according to an embodiment of the disclosure.

As illustrated in FIG. 4, in an embodiment, an electronic device is provided. The device includes: a transceiver 210, a memory 220, a processor 230, and a computer program stored on the memory 220 and executed by the processor 230.

The processor 230 is connected to/with the transceiver 210 and the memory 220 respectively, and configured to implement/perform, by executing the computer program, one or more of the above information processing methods applied to a server, or can be configured to perform one or more of the above information processing methods applied to a mobile device.

The transceiver 210 can correspond to various types of devices with an information transceiving function, for example, a transceiving antenna and/or a network card, etc.

The memory 220 can correspond to a memory 220 including a storage medium, and can be a random access memory 220, a read-only memory 220, a programmable array, an application processor 230 or an application-specific integrated circuit, etc.

The memory 220 can be configured to store information.

The processor 230 can be a central processor, a microprocessor, a digital signal processor, the application-specific integrated circuit, the programmable array or the like. The processor can be connected to the memory and the transceiver via an integrated circuit bus and so on, and is configured to perform, by means of execution of a computer program and so on, the above information processing methods applied to the server or the mobile device.

The electronic device in this embodiment can be the above mobile device.

An embodiment further provides a computer storage medium. The computer storage medium stores a computer program. After the computer program is executed, an information processing method provided by one or more of the above technical solutions can be performed, for example, one or more of information processing methods applied to the server can be performed, or one or more of information processing methods applied to a mobile device can be performed.

The computer storage medium can include: various media capable of storing a program code such as a mobile storage device, a Read-Only Memory (ROM), a Random Access Memory (RAM), a magnetic disk or an optical disc, etc. The computer storage medium can be a non-instantaneous/non-transitory storage medium optionally.

Several specific examples will be provided hereinafter in combination with any embodiments as above.

Example 1

This example provides a callable retailing robot (corresponding to the above mobile device). When the callable retailing robot is operated in an indoor or outdoor ground (for example, a shopping mall, a departure hall, a park and the like), one or multiple robots are contained generally. Each robot includes the following components in part or whole:

a movable chassis having a battery (corresponding to the above motion apparatus), and an automatic vending machine cabinet on the chassis (the loading apparatus); a commodity is presented inside the vending machine cabinet, and a user can purchase the commodity via a manner of scanning a code for payment and the like;

a sensor of the robot implemented for independent obstacle avoidance, for example, a laser radar, a depth sensor, an ultrasonic sensor, an infrared distance measurement sensor, a millimeter-wave radar and the like; relative position information between the obstacle and the mobile device is detected via these sensors, so that an environmental obstacle avoidance map can be drawn out;

a motion control module for controlling the robot to move to the appointed path point with reference to the environment obstacle avoidance map, so as to automatically avoid any static or dynamic obstacle in operation;

a camera for identifying position information and attribute information (for example, an age and a gender) of a surrounding person via calculation; the robot has a sensor for implementing indoor or outdoor positioning, such as a Global Position System (GPS), or a laser radar, or a camera, etc;

a communication module connected to the Internet and configured to interact with a server; and a man-machine interaction module such as a loudspeaker, a screen, lamplight, a microphone and the like for interaction with the user.

In addition to a robot body, in order to support the operation of the system, a server, a management backend, and a charging pile can be also contained.

The server is configured to record and manage all positioning information, an image identification result, marketing behaviors, abnormal behaviors and the like of the robot under the government. The management backend is a possessor of the robot, and can read a real-time state and historical operation data of all robots. The information provides a data support for replenishment, operation and other behaviors of background personnel. The charging pile is for the independent charging of the robot.

Example 2

This example provides an information processing method based on a mobile device, which can include the following steps.

At Step 1: a robot pre-stores an operation planed path (such as a circular path) in a place. During operation, the robot calculates a surrounding environment obstacle avoidance map in real time via an independent obstacle avoidance sensor, and selects a next path point nearest to a current position from the path based on positioning information of a current positioning sensor. A motion control module of the robot is operated to the path point with reference to the environment obstacle avoidance map, so as not to collide with any static or dynamic obstacle in operation. If the path point is blocked by an obstacle or reached, the robot automatically switches to the next path point for operation.

In some embodiments, a body identification module of the robot identifies an age, a gender, a dressing and other attributes of a surrounding person during the motion. When the person is identified, the robot broadcasts some advertisement words based on the attributes of the person and attributes of the commodity loaded on the robot; or/and, the robot plays a visual advertisement on a screen; or/and, the robot lowers/reduces an operation speed.

At Step 2: during the motion, the robot is triggered by a user for purchasement and then stops moving. The trigger manner can include the following manners: a physical button on the robot, a voice command, special posture identification of a body, touch to the robot, a gaze at the robot, a fixed physical button out of the robot, or a touch screen.

At Step 3: after the motion of the mobile device stops, the user can purchase via the following manners.

The user scans a two-dimensional code on the robot by using the mobile phone, selects the commodity, and makes a payment via a program on the mobile phone or a webpage. Such a manner requires the robot to connect to a network.

The payment is directly made via a manner of inserting a coin and inserting a paper currency into a box, and the commodity is selected by using a button or a contact screen on the box. This manner does not need the robot to connect to the network.

After the payment, the robot releases the corresponding commodity. After the user takes the commodity, the marketing is completed.

Upon the determination that the article is taken away (for example, a door is closed, an article warehouse is empty, the user is far away, or the payment exceeds for a certain time), the robot restores an operation state and continues to advance along the path.

Example 3

This example is similar to the example 2. However, the step 1 is modified as follows.

A robot calculates a surrounding environment obstacle avoidance map in real time via an independent obstacle avoidance sensor. Meanwhile, a body identification module of the robot can identify body position and attribute in one or more directions of a vehicle, and select a current position of one person (a potential object) as a target. A motion control module of the robot is operated to the target with reference to the environment obstacle avoidance map, so as to assure not to collide with any static or dynamic obstacle in operation.

The strategy for selecting the potential object can be one or more combinations of the followings.

The direction where the potential object is located and a previous motion direction of the vehicle are close (to prevent running in circles back and forth at one place).

The direction where the potential object is located is not congested, and a passing space is provided.

The attributes of the potential object such as an age and a gender comply with those of a commodity.

The direction where the potential object is located is close to a preset general motion tendency.

Before reaching the position where the potential object is located, the robot has the following several operation manners.

The robot ignores a subsequent state of the target completely, and moves all the time to an initial position where the potential object is located. Then, the robot finds a new potential object for tracking.

The robot tracks the potential object when the potential object moves, and modifies the potential object dynamically. If the potential object is lost, the robot reselects a new potential object.

After reaching the position where the potential object is located, and before finding a new potential object and tracking the new potential object, the robot has the following several operation manners.

The robot stays at an original place.

The robot continues to move back to a pre-stored motion planned path and operates along the path.

The robot continues to advance, and moves towards a direction of a random or other preset strategies.

Example 4

On the basis of the example 2, a server establishing connection with a mobile device analyzes positioning information, an image identification result and marketing data of all robots in a certain place in a period of time. The automatic operation and optimization of the following example is carried out.

For an area with lower marketing data (a second type of area), the robot will pass through the area quickly. For an area with higher marketing data (a first type of area), the robot will lower/reduce an operation speed.

An overall operation planned path is adjusted regularly, the travel in the area with lower marketing data is avoided as much as possible, and the exploration of other paths in the area with higher marketing data is increased.

A replenishment plan of a marketing commodity is adjusted, the commodity with a high sales volume is increased, the commodity with a low sales volume is reduced, and some expired commodities are withdrawn.

An operation path of the robot within one day is switched automatically according to peak-valley time of the marketing, so as to optimize a marketing strategy in different time periods.

Independent charging time of the robot is scheduled automatically according to the peak-valley time of the marketing, so as to guarantee that the robot has an enough electric quantity in a peak period and does not need to come back to a charging pile for charging.

In some embodiments provided by the disclosure, it should be understood that the disclosed equipment and method can be implemented in another manner. The equipment embodiment described above is only schematic, and for example, division of the units is only logic function division, and other division manners can be adopted during practical implementation. For example, multiple units or components can be combined or integrated into another system, or some characteristics can be neglected or not executed. In addition, coupling, or direct coupling or communication connection between each displayed or discussed component can be indirect coupling or communication connection, implemented through some interfaces, of the equipment or the units, and can be electrical and mechanical or adopt other forms.

The units described as separate parts can or cannot be physically separated, and parts displayed as units can or cannot be physical units, and namely can be located in the same place, or can also be distributed to multiple network units. Part or all of the units can be selected to achieve the purpose of the solutions of the embodiments according to a practical requirement.

In addition, each function unit in each embodiment of the disclosure can be integrated into a processing unit, each unit can also exist independently, and two or more than two unit can also be integrated into a unit. The integrated unit can be implemented in a hardware form, and can also be implemented in form of hardware and software function unit.

Those skilled in the art should know that: all or part of the steps of the above method embodiment can be implemented by instructing related hardware through a program, the above program can be stored in a computer-readable storage medium, and the program is executed to execute the steps of the above method embodiment. The above storage medium includes: various media capable of storing a program code such as a motion storage device, an ROM, an RAM, a magnetic disk or an optical disc.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

INDUSTRIAL APPLICABILITY

According to the technical solutions in embodiments of the disclosure, a mobile device loaded with an article automatically determines a motion parameter, and collects pre-determined information during the motion. When the collected information indicates that a user needs the article, the mobile device suspends to move. Therefore, the demand that the user takes the article from the mobile device can be met at any time, the positive industrial effect is achieved, the implementation is simple and convenient, and the technical solutions can be produced and applied in a large scale in industry.

The invention claimed is:

1. An information processing method, applied to a mobile device loaded with an article, comprising:
   determining a motion parameter according to a motion mode and obstacle information;
   carrying out a motion according to the motion parameter;
   collecting pre-determined information during the motion; and
   suspending the motion when the pre-determined information indicates that a user needs to acquire the article;
   wherein the determining a motion parameter according to a motion mode and obstacle information comprises:
   determining an overall motion parameter according to the motion mode; wherein the overall motion parameter is used for controlling the mobile device to move from a current position to a target position;
   wherein the determining an overall motion parameter according to the motion mode comprises:
      when the motion mode is a third motion mode, determining area information about a first type of area and a second type of area; wherein demand frequency of the article in the first type of area is higher than demand frequency of the article in the second type of area;
      selecting the first type of area as an area where the target position is located according to the area information; and
      determining a first average motion rate for the first type of area and a second average motion rate for the second type of area; wherein the first average motion rate is lower than the second average motion rate.

2. The method of claim 1, wherein
   the collecting pre-determined information during the motion comprises at least one of:
      collecting operation information acted on a man-machine interaction module during the motion;
      collecting first image information during the motion; or
      collecting voice information during the motion.

3. The method of claim 1, wherein
   the determining a motion parameter according to a motion mode and obstacle information comprises:
      determining an instantaneous motion parameter by using the obstacle information; wherein the instantaneous motion parameter is used by the mobile device to avoid an obstacle in a process of moving from the current position to the target position.

4. The method of claim 1, wherein
   the determining an overall motion parameter according to the motion mode comprises:
      when the motion mode is a first motion mode, determining a motion path and an overall motion direction corresponding to the first motion mode; wherein the motion path is a circular path containing multiple sites; and
      selecting one site from the circular path as the target position; wherein the selected site is a site nearest to the mobile device in the overall motion direction.

5. The method of claim 4, wherein
   the determining an overall motion parameter according to the motion mode comprises:
      when the motion mode is a second motion mode, collecting second image information;
      analyzing the second image information to determine a potential user, and acquiring position information of the potential user; and
      determining the target position to which the mobile device moves according to the position information.

6. The method of claim 5, wherein the analyzing the second image information to determine a potential user comprises:
   analyzing the second image information, and selecting a user with a movement direction along an overall motion direction of the mobile device from the second image information as the potential user;
   analyzing the second image information, acquiring a user attribute according to an analyzed result, and selecting an alternative user matched with the article loaded on the mobile device as the potential user according to the user attribute; or
   selecting an alternative user with a located direction consistent with an instantaneous motion direction of the mobile device from the second image information as the potential user.

7. The method of claim 4, wherein the overall motion direction includes: a first direction for moving clockwise along the circular path, and a second direction for moving counterclockwise along the circular path.

8. The method of claim 1, further comprising:
   carrying out energy supplementation in an energy supplementation area in a first time interval;
   the carrying out a motion according to the motion parameter comprises:
      carrying out the motion in an area out of the energy supplementation area in a second time interval according to the motion parameter;
      wherein demand frequency of the article in the first time interval is lower than demand frequency of the article in the second time interval.

9. The method of claim 1, wherein
   the motion parameter comprises: a motion direction, a motion speed, motion acceleration, and a target position of the motion;
   the pre-determined information is any information for indicating that the user intends to take the article from the mobile device;

the area information is boundary information of different areas;

the overall motion parameter is a parameter on which the mobile device acts within a period of time, which includes: an overall motion direction of the motion from the current position to the target position, and an average motion rate of the motion from the current position to the target position.

10. An electronic device, comprising: a transceiver, a memory, a processor, and a computer program stored on the memory and executed by the processor, wherein the processor is connected to the transceiver and the memory respectively, and the processor is configured to:

determine a motion parameter according to a motion mode of a mobile device loaded with an article and obstacle information;

carry out a motion according to the motion parameter;

collect pre-determined information during the motion;

suspend the motion when the pre-determined information indicates that a user needs to acquire the article;

determine an overall motion parameter according to the motion mode; wherein the overall motion parameter is used for controlling the mobile device to move from a current position to a target position;

when the motion mode is a third motion mode, determine area information about a first type of area and a second type of area; wherein demand frequency of the article in the first type of area is higher than demand frequency of the article in the second type of area;

select the first type of area as an area where the target position is located according to the area information; and determine a first average motion rate for the first type of area and a second average motion rate for the second type of area; wherein the first average motion rate is lower than the second average motion rate.

11. The electronic device of claim 10, wherein the processor is further configured to at least one of:

collect operation information acted on a man-machine interaction module during the motion;

collect first image information during the motion; or collect voice information during the motion.

12. The electronic device of claim 10, wherein the processor is further configured to:

determine an instantaneous motion parameter by using the obstacle information; wherein the instantaneous motion parameter is used by the mobile device to avoid an obstacle in a process of moving from the current position to the target position.

13. The electronic device of claim 10, wherein the processor is further configured to:

when the motion mode is a first motion mode, determine a motion path and an overall motion direction corresponding to the first motion mode; wherein the motion path is a circular path containing multiple sites; and select one site from the circular path as the target position; wherein the selected site is a site nearest to the mobile device in the overall motion direction.

14. The electronic device of claim 13, wherein the processor is further configured to:

when the motion mode is a second motion mode, collect second image information;

analyze the second image information to determine a potential user, and acquire position information of the potential user; and determine the target position to which the mobile device moves according to the position information.

15. The electronic device of claim 10, wherein the processor is further configured to:

carry out energy supplementation in an energy supplementation area in a first time interval; and carry out the motion in an area out of the energy supplementation area in a second time interval according to the motion parameter;

wherein demand frequency of the article in the first time interval is lower than demand frequency of the article in the second time interval.

16. A non-transitory computer-readable storage medium, storing a computer program, wherein the computer program is capable of performing, after being executed, an information processing method, applied to a mobile device loaded with an article, comprising:

determining a motion parameter according to a motion mode and obstacle information;

carrying out a motion according to the motion parameter;

collecting pre-determined information during the motion; and suspending the motion when the pre-determined information indicates that a user needs to acquire the article;

wherein the determining a motion parameter according to a motion mode and obstacle information comprises:

determining an overall motion parameter according to the motion mode; wherein the overall motion parameter is used for controlling the mobile device to move from a current position to a target position;

wherein the determining an overall motion parameter according to the motion mode comprises:

when the motion mode is a third motion mode, determining area information about a first type of area and a second type of area; wherein demand frequency of the article in the first type of area is higher than demand frequency of the article in the second type of area;

selecting the first type of area as an area where the target position is located according to the area information; and determining a first average motion rate for the first type of area and a second average motion rate for the second type of area; wherein the first average motion rate is lower than the second average motion rate.

17. The non-transitory computer-readable storage medium of claim 16, wherein the collecting pre-determined information during the motion comprises at least one of:

collecting operation information acted on a man-machine interaction module during the motion;

collecting first image information during the motion; or collecting voice information during the motion.

18. The non-transitory computer-readable storage medium of claim 16, wherein the determining a motion parameter according to a motion mode and obstacle information comprises:

determining an instantaneous motion parameter by using the obstacle information; wherein the instantaneous motion parameter is used by the mobile device to avoid an obstacle in a process of moving from the current position to the target position.

19. The non-transitory computer-readable storage medium of claim 16, further comprising:

carrying out energy supplementation in an energy supplementation area in a first time interval;

the carrying out a motion according to the motion parameter comprises:
  carrying out the motion in an area out of the energy supplementation area in a second time interval according to the motion parameter;
  wherein demand frequency of the article in the first time interval is lower than demand frequency of the article in the second time interval.

* * * * *